No. 812,695. PATENTED FEB. 13, 1906.
H. J. SPRINGER.
POTATO PLANTER.
APPLICATION FILED SEPT. 9, 1905.
2 SHEETS—SHEET 1.
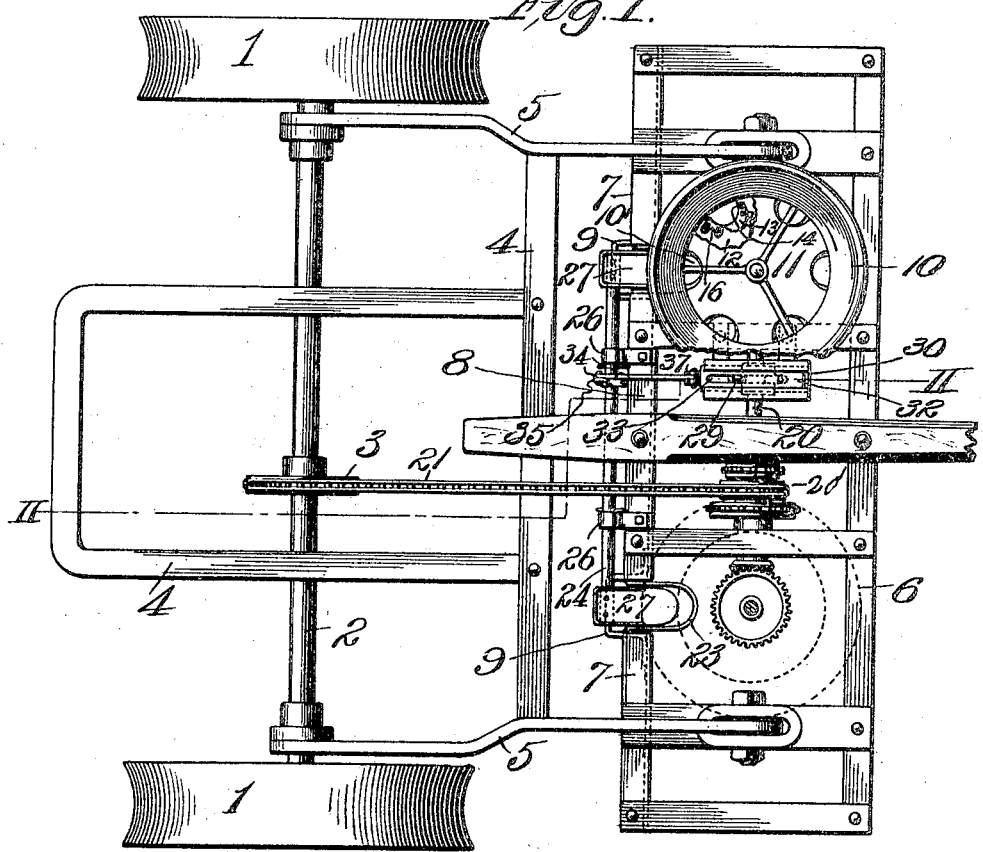
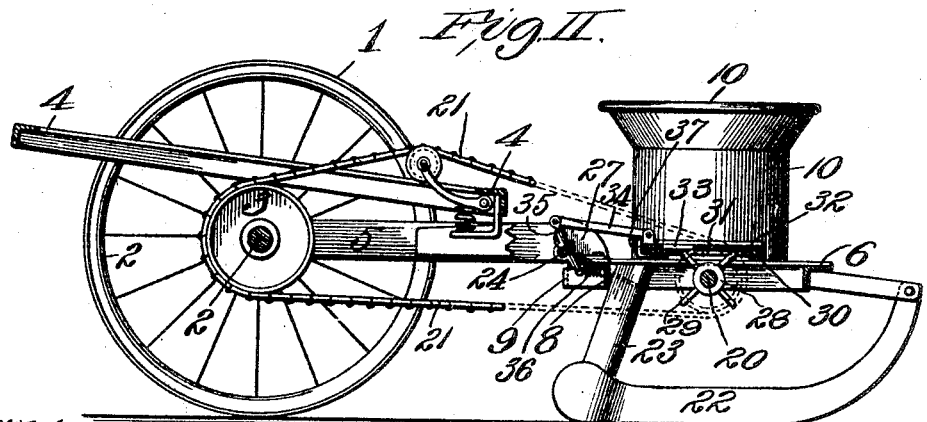

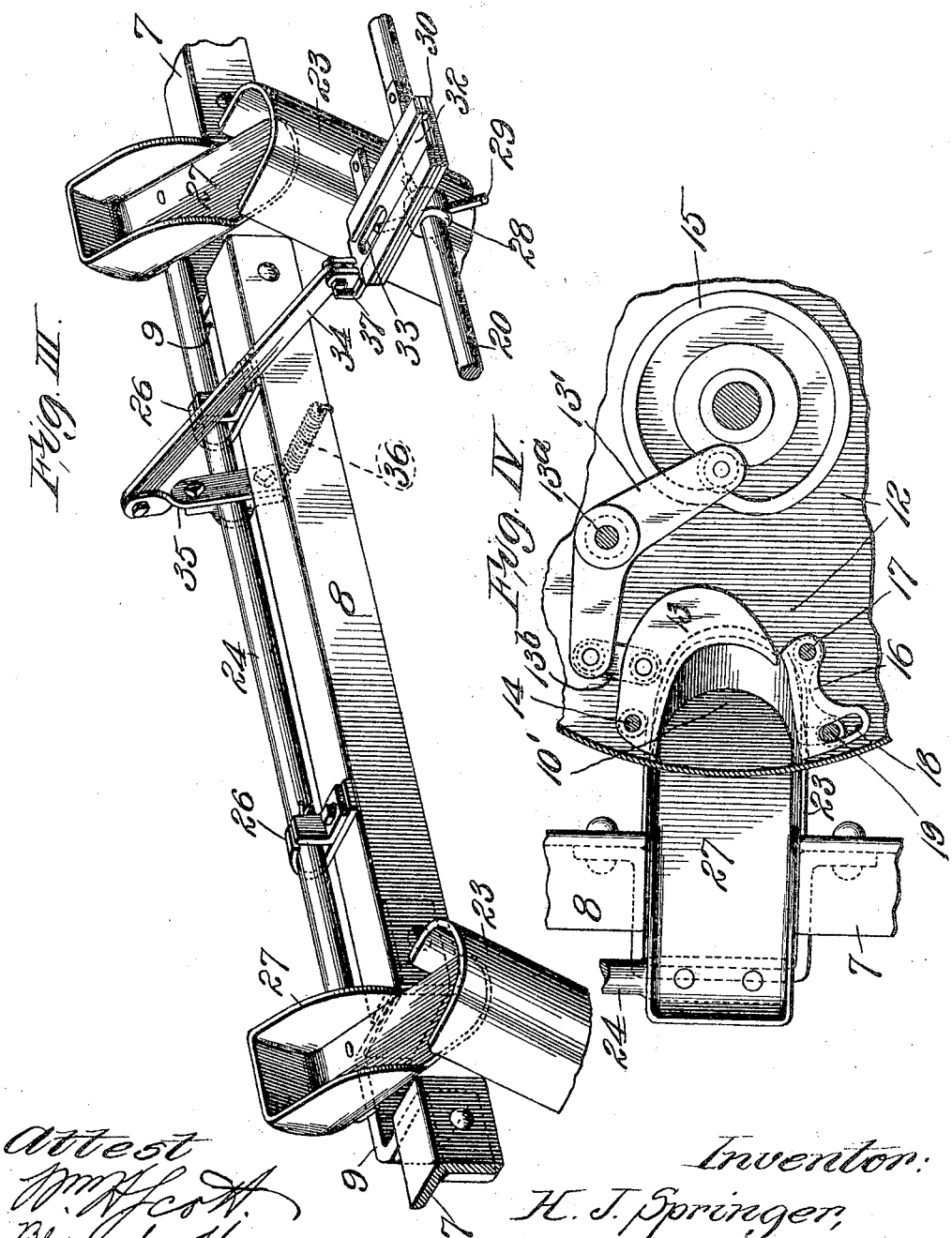

UNITED STATES PATENT OFFICE.

HENRY J. SPRINGER, OF EDWARDSVILLE, ILLINOIS, ASSIGNOR TO SPRINGER BROS. MANUFACTURING COMPANY, OF EDWARDSVILLE, ILLINOIS, A CORPORATION.

POTATO-PLANTER.

No. 812,695.     Specification of Letters Patent.     Patented Feb. 13, 1906.

Application filed September 9, 1905. Serial No. 277,752.

*To all whom it may concern:*

Be it known that I, HENRY J. SPRINGER, a citizen of the United States, residing in Edwardsville, in the county of Madison and State of Illinois, have invented certain new and useful Improvements in Potato-Planters, of which the following is a full, clear, and exact description, reference being had to the accompanying drawings, forming part of this specification.

My invention relates to an improvement in potato-planters, such as illustrated in Letters Patent of the United States issued to Henry J. Springer November 24, 1903, No. 744,984, and to the Springer Bros. Manufacturing Company June 13, 1905, No. 792,293, and July 25, 1905, No. 795,657.

The present invention has reference to mechanically-operated means operating in the chutes of the planter and by which the potatoes are received as they are fed from the seedboxes and from which the potatoes are dropped to descend through the chutes at the proper times and to the ground at the proper intervals of space.

The present invention also has reference to means for adjustably holding the fixed carrier-wings in the seedboxes by which the potatoes are carried to the outlets from said boxes.

Figure I is a top or plan view of my potato-planter with parts broken out. Fig. II is a longitudinal vertical section taken on line II II, Fig. I. Fig. III is an enlarged perspective view of the potato-dropping mechanism, and Fig. IV is an enlarged view of a portion of one of the seedboxes, one pair of the potato-carrier wings in said box, and showing in plan the upper end of the adjacent chute and the dropping member that operates in said chute.

1 designates the ground-wheels of my planter, which are connected by an axle 2, that has fixed thereto a toothed driving-wheel 3.

4 designates the main frame of the planter, which includes draft-bars 5, that are secured at their rear ends to the axle 2.

6 designates the forward or seedbox carrying frame, to which the draft-bars 5 are connected and which includes in its rear portion a cross-bar consisting of outer sections 7 and an inner section 8, said inner section 8 being spaced apart from the outer sections and joined to them by bowed straps 9, as seen most clearly in Fig. III.

10 designates the seedboxes, which are supported by the forward frame 6. Each of these seedboxes is provided with a rotatable false bottom 11, as shown and described in Letters Patents No. 744,984 and No. 795,657, hereinbefore referred to, that is located above and spaced apart from the main bottom 12. The false bottom 11 carries a plurality of swinging carrier-wings 13, pivotally connected thereto by pivot-pins 14 and to which rocking motion is imparted through the medium of a fixed cam 15. The swinging carrier-wing cam-operated means comprises a double-armed lever 13', pivoted to the false bottom 11 at 13ª and connected to the wings by links 13ᵇ.

16 designates adjustable carrier-wings opposing the swinging wings, which are rockingly secured to the false bottom 11 by pivot-pins 17 and which are adapted to be held in fixed positions relative to the swinging carrier-wings, but which are susceptible of adjustment toward or away from the outer potato-carrying ends of the swinging wings for the purpose of diminishing or increasing the width of the space between said wings. In the outer end of each of the adjustable wings is a slot 18. The slot in each of said wings is adapted to receive a set screw or bolt 19, that passes through the false bottom 11 and by which the wing may be drawn tightly to the false bottom to hold it from movement after it has been adjusted relative to the opposing swinging carrier-wing. As in the Letters Patent referred to, the main bottom of each seedbox is provided with a single outlet 10', through which the potatoes are discharged as they are conveyed to said outlet by the pairs of carrier-wings, between which they enter as they pass through openings in the false bottom of the seedbox. The false bottom of the seedbox is rotated through the medium of a shaft 20, secured to said false bottom, and driven through the medium of an endless chain 21, leading from the axle-carried toothed wheel 3 to a toothed wheel 20' upon the false-bottom-driving shaft 20.

22 designates one ot the runners or furrow-openers of the planter, and 23 designates the chutes leading downwardly from positions adjacent to the outlets 10' of the seedboxes 10. (See Figs. I and IV.)

24 designates a rock-shaft that is supported by brackets 26, secured to the rear central section 8 of the seedbox-carrying frame 6.

27 designates valves or buckets that are rigidly fixed to the rock-shaft 24 and which are arranged to operate in the upper ends of the chutes 23 and to be moved rearwardly into the spaces between the central and outer sections 8 and 7 at the rear of the frame 6. The valves 27 are preferably provided with side and rear walls, as seen in Fig. III, to prevent the potatoes descending onto said valves escaping therefrom by passing over their side or rear edges, thereby causing them to be confined in the upper portions of the chutes and above the valves when they are discharged from the seedboxes into the chutes.

28 designates a finger-wheel fixed to the driving-shaft 20 and having any desirable number of fingers 29. 30 is a guide that is secured by suitable means to the seedbox-supporting frame, as seen in Figs. I and II. This guide is located above the driving-shaft 20 at the location of the finger-wheel 28, and it is provided with a longitudinal slot 31, (see Fig. II,) through which the fingers of said wheel are adapted to operate.

32 is a slide confined within the guide 30, but susceptible of reciprocation in a longitudinal direction therein and transversely of the driving-shaft 20. This slide 32 is provided with a longitudinal slot 33, that is adapted to receive the fingers 29 as they operate through the slot 31 in the guide 30.

34 is a throw-rod that is pivoted at its forward end to the forward end of the slide 32. This throw-rod has pivotal connection at its rear end to a rocking arm 35, rigidly secured to the rock-shaft 24, thereby providing for rocking motion being imparted to said rock-shaft when said throw-rod is drawn forwardly by the slide 32. The rocking arm 35 is secured to the rock-shaft 24 intermediate of its ends and to its end opposite that to which the throw-rod is connected is attached a retractile spring 36, that is attached to the central section 8 of the seedbox-carrying frame.

37 is a stop carried by the guide 30 and extending rearwardly therefrom in the line of movement of the slide 32. This stop is adapted to limit the rearward movement of said slide when it is reciprocated under the influence of the retractile spring 36.

In the operation of the dropping mechanism the potatoes are discharged from the seedboxes in the manner previously explained and fall into the chutes 23 to rest upon the valves 27. Each time that a proper point for the potatoes to be dropped is reached during the travel of the planter one of the fingers 29, carried by the driving-shaft 20, passes through the slot in the guide 30 and enters the slot in the slide 32. Immediately after it enters the slot in the slide it engages the slide and reciprocates it forwardly in said guide, thereby exerting a pull upon the throw-rod 34. The throw-rod is therefore caused to effect a pull upon the rocking arm 35, as a result of which the rock-shaft 24 is oscillated in its bearings to tilt the valves 27 downwardly and rearwardly in order that the potatoes previously upheld thereby may fall through the chutes 23 and to the ground. After reciprocating the slide 32 forwardly to the desired extent the finger that has engaged it slips out of the slot in the slide, thereby freeing it. The retractile spring 36 then returns the parts to their normal positions ready for the next operation, as before.

I claim as my invention—

1. In a potato-planter, the combination of a seedbox, means in said seedbox for delivering seed therefrom, a chute into which the seed is delivered, a driven shaft for operating said seed-delivering means, a rock-shaft, a valve carried by said rock-shaft and arranged to operate in said chute, and means actuated by said driven shaft connected to said rock-shaft to impart oscillation thereto, substantially as set forth.

2. In a potato-planter, the combination of a seedbox, means for delivering seed therefrom, a chute into which the seed is delivered, a driven shaft provided with a finger and arranged to operate said seed-delivering means, a rock-shaft, a valve carried by said rock-shaft and arranged to operate in said chute, and a slide connected to said rock-shaft and arranged to be engaged by the finger of said driven shaft, substantially as set forth.

3. In a potato-planter, the combination of a chute, a rock-shaft, a valve carried by said rock-shaft and arranged to operate in said chute, a slide having connection with said rock-shaft, and a driven shaft having a finger arranged for engagement with said slide, substantially as set forth.

4. In a potato-planter, the combination of a chute, a rock-shaft, a valve carried by said rock-shaft and arranged to operate in said chute, a slide having connection with said rock-shaft, a driven shaft having a finger arranged for engagement with said slide, and a guide in which said slide operates, substantially as set forth.

5. In a potato-planter, the combination of a chute, a rock-shaft, a valve carried by said rock-shaft and arranged to operate in said chute, a slide having connection with said rock-shaft, a driven shaft having a finger arranged for engagement with said slide, and a retractile spring connected to said rock-shaft for returning it to normal position after it has been oscillated by said slide, substantially as set forth.

6. In a potato-planter, the combination of a chute, a rock-shaft, a valve carried by said rock-shaft, and arranged to operate in said chute, a slide having connection with said rock-shaft, a driven shaft, and a finger-wheel carried by said driven shaft and arranged for engagement with said slide, substantially as set forth.

7. In a potato-planter, the combination of a seedbox having a main bottom and an apertured rotatable false bottom, swinging wings carried by said false bottom at the location of the apertures therein, and adjustable wings opposing said swinging wings, substantially as set forth.

8. In a potato-planter, the combination of a seedbox having a main bottom and an apertured false bottom, swinging wings carried by said false bottom at the location of the apertures therein, adjustable wings opposing said swinging wings, and means for securing said adjustable wings to said false bottom in fixed positions, substantially as set forth.

H. J. SPRINGER.

In presence of—
GUS SOEHLKE,
LELAND H. BUCKLEY.